United States Patent [19]

Barker

[11] 3,725,535
[45] Apr. 3, 1973

[54] MANUFACTURE OF BASIC CUPRIC COMPOUNDS

[75] Inventor: James E. Barker, Freehold, N.J.

[73] Assignee: Cities Service Company, New York, N.Y.

[22] Filed: Oct. 22, 1970

[21] Appl. No.: 83,214

[52] U.S. Cl. ..................423/419, 423/557, 423/604, 423/385, 423/493
[51] Int. Cl. ............................................C01b 31/24
[58] Field of Search....23/50, 55, 102, 125, 129, 183, 23/147, 61; 423/385, 493, 419, 604, 557

[56] References Cited

UNITED STATES PATENTS 2,073,977   3/1937   Serciron ................................23/125
1,358,619   11/1920  Christensen ...........................23/147
2,581,951   1/1952   Harshaw et al. .......................23/55 X
2,493,262   1/1950   Porvasnik ............................23/102 R X Primary Examiner—Herbert T. Carter
Attorney—J. Richard Geaman

[57] ABSTRACT

Copper chemicals can be prepared from cuprous oxide by aerating a suspension of cuprous oxide in an appropriate medium. Thus, tribasic copper sulfate, a fungicide, can be prepared by aerating a suspension of cuprous oxide in an aqueous solution of copper sulfate.

4 Claims, No Drawings

MANUFACTURE OF BASIC CUPRIC COMPOUNDS

BACKGROUND OF THE INVENTION

This invention relates to the oxidation of metal oxides and metal hydroxides from a lower valence state to a higher valence level. More particularly, this invention relates to a novel method for obtaining valuable metallic compounds from metal oxides by oxidizing a suspension of a metal oxide to a higher valence level while said oxide is suspended in an appropriate medium.

In one embodiment of this invention, various copper chemicals, useful as fungicides, can be prepared by aerating a suspension of cuprous oxide in an appropriate medium.

At the present time, a majority of cupric chemicals are made by using copper sulfate as the starting material, with appropriate reagents and reactions giving the desired products. For example, tribasic copper sulfate, $3 Cu(OH)_2 \cdot CuSO_4$, a well-known fungicide, is usually prepared by subjecting metallic copper to the action of sulfuric acid and air, resulting in a solution of copper sulfate. This copper sulfate solution is then treated with ammonium hydroxide to give the desired tribasic copper sulfate, with ammonium sulfate produced as a discarded by-product. The method of using copper sulfate in this preparation is expensive, since purified copper is the desired starting material, and excess sulfuric acid and ammonium hydroxide are used, with a dilute solution of unwanted ammonium sulfate being the by-product.

The present invention offers a method of making this and similar copper chemicals simply, directly, and inexpensively, and without unwanted by-products.

SUMMARY OF THE INVENTION

It has now been found that when an oxide of copper, in a lower oxidation state, is suspended in an aqueous medium containing a suitable reagent and aerated, the copper ion is oxidized to a higher oxidation state, and valuable copper compounds can be recovered. For example, when a mixture of air and carbon dioxide is bubbled through an aqueous suspension of cuprous (copper I) oxide, basic cupric (copper II) carbonate can be obtained.

As starting material, cuprous oxide is the preferred compound. More particularly, the product prepared by the method of U.S. Pat. No. 3,457,035 is the preferred source of cuprous oxide. Cuprous oxide is the preferred source of the cuprous ion, since cuprous oxide provides this ion in a reactive form under the conditions employed herein and introduces no foreign ions. A person wishing to prepare basic cupric sulfate might contemplate starting with, for example, cuprous chloride as the cuprous ion source. But the chloride ion shows a reluctance to part from the cuprous ion, so that if a mixture of cuprous chloride and cupric sulfate solutions is aerated, a mixture of basic cupric chloride and basic cupric sulfate is formed. On the other hand, cuprous oxide appears to hydrate readily, yielding what some believe to be an intermediate compound such as cuprous hydroxide, which is available for oxidation and metathetical reactions.

Cupric oxide is not a desirable starting reagent for the preparation of, for example, basic cupric sulfate $[CuSO_4 \cdot 3 Cu(OH)_2]$, since cupric oxide is not particularly reactive under the conditions employed herein. Thus the preparation of basic cupric sulfate by the method of slurrying cupric oxide in water and adding cupric sulfate is quite difficult, slow and results in poor yields. In like manner, the attempted reaction of an aqueous slurry of cupric oxide with an hydroxide such as ammonium hydroxide to produce cupric hydroxide is slow and offers a poor yield.

Cuprous oxide is desirably suspended in an aqueous solution containing the product precursor reagent. The product precursor reagent contained in the aqueous solution is selected on the basis of the desired product. The product precursor reagent is, broadly, an anion source capable of reacting with cuprous or cupric ion in a chemical reaction to yield a desired copper compound. For example, ammonium hydroxide can furnish hydroxyl ion in the preparation of cupric hydroxide. And carbon dioxide, possibly in the hydrated form of carbonic acid, can furnish carbonate ion in the preparation of basic cupric carbonate. Thus, one desirous of preparing, for example, tribasic copper sulfate would have sulfuric acid and/or copper sulfate present in the water. One desirous of forming cupric hydroxide would have ammonium hydroxide present in the reaction medium as a source of hydroxyl ions, as will be described in greater detail below. Naturally, the preparation of sulfite, arsenite, etc. dictates the presence of these ions or precursors in the aqueous medium. Such reactions can be illustrated by the following equations:

a. $2 Cu_2O + H_2SO_4 + O_2 + 2 H_2O \rightarrow [CuSO_4 \cdot 3 Cu(OH)_2]$ b. $6 Cu_2O + 4 CuSO_4 + 12 H_2O + 3 O_2 \rightarrow 4[CuSO_4 \cdot 3Cu(OH)_2]$

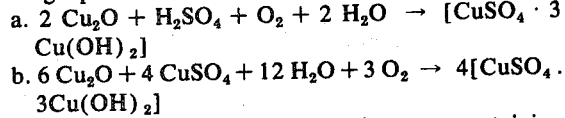

The suspension of cuprous oxide in water containing a product precursor reagent can be aerated in any suitable manner with a convenient oxidizing gas. It is most convenient to employ air as the aerating agent insofar as it is inexpensive and directly available. It will be apparent, however, that other gases, such as sulfur dioxide, nitrogen dioxide, air or oxygen, can be bubbled through the suspension of cuprous oxide, depending on the product being made. Desirably, the suspension is aerated from the bottom for the obvious purpose of permitting most efficient possible contact with the gas and the reactants, and also to keep the oxide in suspension. Respecting equipment, any convenient means of aerating the suspension is acceptable. Thus, one can use a Pachuca tank, flotation machine, gas-absorption apparatus, bubbler, etc. The minimum amount of oxidizing gas needed is the stoichiometric amount for the reaction involved. Typically, an excess is used, to assure complete oxidation of the cuprous ion, with the excess gas being vented or recirculated. It should be noted that the oxidizing gas employed should not contain carbon dioxide (except when making basic carbonate), reducing gas, reducing sulfur components, or organic compounds such as acetylene and ethylene. As will be seen below, the reaction between cuprous oxide, air, water and carbon dioxide results in the formation of basic cupric carbonate; certain sulfur compounds result in the formation of basic cupric and cuprous sulfites, while nitrogen oxides similar result in the formation of basic copper nitrates, nitrites, etc. Components such as acetylene yield acetylide which is explosive, while unsaturated compounds such as ethylene, etc. tend to retard oxidation. The parameters of the reaction, although not critical, can have an important effect on the rate of reaction, yield, etc.

It has been found that a temperature of from about 30°F. to about 150°F. is useful, while a temperature in the range from about 50°F. to about 100°F. is preferred. Conveniently, the reaction is conducted at room temperature. This, of course, simplifies the procedure and reduces the equipment necessary to conduct the reaction.

The concentration of cuprous oxide suspended in water can vary from about 1 percent by weight to about 30 percent by weight, with the lower value offering a somewhat dilute reagent, while, at higher concentrations, the suspension becomes viscous and unstable. A preferred range is from about 5 percent by weight to about 20 percent by weight of cuprous oxide, with a range of from about 10 percent by weight to about 15 percent by weight being the most preferred, since this range offers an operable suspension and an economical throughput. This range also assures a sufficient excess of water necessary for the reaction, since the exemplary reactions indicate one or two moles of water per mole of cuprous oxide.

The concentrations of the product precursor reagents involved in the preparation of the copper chemicals are rather broad. Normally, a preferred concentration is that which will furnish the stoichiometric amount necessary for the reaction. For the various gases which can be used, such as carbon dioxide and the oxides of nitrogen and sulfur, the minimum will be the stoichiometric amount needed for complete reaction to give the desired product. Typically, an excess of gas will be introduced into the reaction medium, with the unused portion being vented or recirculated.

Where ammonia is added to the aqueous reaction medium, the concentration of ammonia therein can vary from about 0.01 percent by weight to about 27 percent by weight, with a desirable concentration range of from about 1 percent by weight to about 15 percent by weight, and a preferred range of about 4 percent by weight to about 12 percent by weight.

The time of the oxidation reaction may vary, depending on the concentration of the oxidizing gas, contact efficiency and nature of the compound to be oxidized. The reaction time may vary from about 1 minute to about 6 hours, with a desirable time of 10 minutes to 2 hours, and a preferred time of 20 minutes to 90 minutes.

In the process described and claimed herein, all materials can be recycled with periodic removal of the desired product. It is particularly desirable that, when the hydroxides are being prepared, especially cupric hydroxide, they be removed periodically. This is so because of the tendency of cupric hydroxide to form cupric oxide and water.

DESCRIPTION OF THE PREFERRED EMBODIMENTS

EXAMPLE I

Cupric hydroxide was prepared by the addition of 4.3 grams of cuprous oxide to 400 ml. of 10 percent by weight aqueous ammonia. This mixture was aerated with air for three-fourths hour at room temperature. Cupric hydroxide precipitate was removed. Analysis for cupric ion: Calculated 65.1 percent; Found 63.5 percent.

EXAMPLE II

Basic cupric carbonate [$CuCO_3 \cdot Cu(OH)_2$] was prepared by adding 5 grams of cuprous oxide to 200 ml. of water and bubbling a mixture of air and carbon dioxide through the suspension at room temperature for three-fourths hour. Theoretical analysis for cupric ion is 57.5 percent; Found 57.23 percent.

EXAMPLE III

Tribasic copper sulfate [$CuSO_4 \cdot 3Cu(OH)_2$] was prepared by adding 8.6 grams of cuprous oxide to 10 grams of $CuSO_4 \cdot 5 H_2O$ in 400 ml. of water and aerating this suspension for 1 hour at room temperature. A precipitate of tribasic copper sulfate was obtained. Calculated analysis for cupric ion in the precipitated tribasic salt was 56.2 percent; Found 56.4 percent.

EXAMPLE IV

Tribasic copper sulfate was prepared by adding 8.6 g. of cuprous oxide to 400 ml. of 0.075 M $H_2SO_4$. The suspension was aerated for 1 hour at room temperature, and a precipitate of tribasic copper sulfate was obtained. Analytical results were: Cu — Calculated: 56.2 percent; Found 55.2 percent; S — Calculated: 7.08 percent; Found: 6.78 percent.

Nitrogen derivatives of copper can be prepared in a similar manner by reacting oxides of nitrogen with cuprous oxide in water. The same general technique can be used to make the basic sulfite, by treating cuprous oxide in water with sulfur dioxide and air.

I claim:

1. A process of converting cuprous oxide into a basic cupric compound whose anion is selected from the group consisting of sulfate, hydroxide and carbonate, which consists essentially of
    suspending cuprous oxide in an aqueous solution consisting essentially of at least a stoichiometric amount of an anion source selected from the group consisting of ammonia, cupric sulfate, sulfuric acid and carbon dioxide and aerating said suspension with a molecular oxygen-containing gas until at least a portion of cuprous oxide is converted.

2. A method according to claim 1 in which the anion source is sulfuric acid or copper sulfate and the product comprises tribasic copper sulfate.

3. A method according to claim 1 in which the anion source is ammonia and the product comprises cupric hydroxide.

4. A method according to claim 1 in which the anion source is carbon dioxide and the product comprises basic cupric carbonate.

* * * * *